United States Patent
Bartov et al.

(10) Patent No.: US 12,264,678 B2
(45) Date of Patent: Apr. 1, 2025

(54) FUEL PUMP DRIVEN BY A VARIABLE DISPLACEMENT MOTOR FOR AERIAL REFUELING OPERATION

(71) Applicant: Federal Industries, Inc., El Segundo, CA (US)

(72) Inventors: Asher Bartov, Beverly Hills, CA (US); Gary L. Larson, Seal Beach, CA (US); Robert W. Deller, St. George, UT (US)

(73) Assignee: Federal Industries, Inc., El Segundo, CA (US)

( * ) Notice: Subject to any disclaimer, the term of this patent is extended or adjusted under 35 U.S.C. 154(b) by 0 days.

(21) Appl. No.: 18/533,879

(22) Filed: Dec. 8, 2023

(65) Prior Publication Data

US 2024/0102476 A1 Mar. 28, 2024

Related U.S. Application Data

(62) Division of application No. 17/246,479, filed on Apr. 30, 2021, now Pat. No. 11,867,185.

(51) Int. Cl.
*F04D 13/04* (2006.01)
*B64D 39/00* (2006.01)
(Continued)

(52) U.S. Cl.
CPC .......... *F04D 13/046* (2013.01); *B64D 39/00* (2013.01); *G05D 16/024* (2019.01); *F03C 1/005* (2013.01); *F04D 1/00* (2013.01)

(58) Field of Classification Search
CPC ........ B64D 39/00; B64D 37/00; B64D 37/14; B64D 37/32; F04D 13/046; F04D 15/0066; F04B 49/20; G05D 16/024
See application file for complete search history.

(56) References Cited

U.S. PATENT DOCUMENTS 9,150,310 B1 * 10/2015 Bray .................. B64D 39/00
2006/0278761 A1 * 12/2006 Cutler .................. B64D 39/00
244/135 A (Continued)

OTHER PUBLICATIONS

"Aerial Refueling Equipment: Boom-Receptacle System and Interface Requirement Recommendations." Aerial Refueling Systems Advisory Group (ARSAG). May 11, 2018. (Year: 2018).*

(Continued)

*Primary Examiner* — Michael C Zarroli
*Assistant Examiner* — Ka Chun Leung
(74) *Attorney, Agent, or Firm* — William Thomas Babbitt

(57) ABSTRACT

A fuel pump system for an aerial refueling system including: a variable displacement motor operable to be driven by a hydraulic fluid pressure; a fuel pump operable to be driven by the variable displacement motor; and a drive system controller (DSC) connected to the variable displacement motor, wherein the DSC is operable to direct an operation of the fuel pump in modes including: a flow control mode operable to maintain an output fuel flow rate from the fuel pump to a predetermined maximum inlet pressure at a reception coupling for a receiver aircraft; a fuel pressure control mode operable to regulate the output fuel flow rate to not exceed the predetermined maximum inlet pressure; and a priority mode operable to reduce the output fuel flow rate in response to a decrease in the hydraulic pressure. Also, a method of refueling a receiver aircraft.

7 Claims, 3 Drawing Sheets

(51) Int. Cl.
  *G05D 16/00*   (2006.01)
  *F03C 1/00*    (2006.01)
  *F04D 1/00*    (2006.01)

(56) References Cited

U.S. PATENT DOCUMENTS

2012/0273619 A1* 11/2012 Tichborne ............... B64C 17/10
                                                  244/135 A
2015/0083864 A1*  3/2015 Black ..................... B64D 39/00
                                                  244/135 A
2017/0197725 A1*  7/2017 Foo ........................ B64U 80/25
2018/0340501 A1* 11/2018 Ni ........................... F04B 49/08

OTHER PUBLICATIONS

"Aerial Refueling Control Manifold." Eaton. Archived by Bing.com on Mar. 10, 2021 at https://cc.bingj.com/cache.aspx?q=Aerial+refueling+control+manifold&d=4857625617464971&mkt=en-US&setlang=en-US&w=WaxGeo1q61Sg_mS3AMz_3GfdTGrTg1fb (Year: 2021).*

* cited by examiner

FUEL PUMP DRIVEN BY A VARIABLE DISPLACEMENT MOTOR FOR AERIAL REFUELING OPERATION

CROSS-REFERENCE TO RELATED APPLICATIONS

This application is a divisional of U.S. patent application Ser. No. 17/246,479 titled "FUEL PUMP DRIVEN BY A VARIABLE DISPLACEMENT MOTOR FOR AERIAL REFUELING OPERATION" and filed Apr. 30, 2021, the contents of which are incorporated herein in their entirety.

FIELD

Aerial refueling of aircraft.

BACKGROUND

Aerial refueling of a manned or unmanned receiver aircraft from a tanker aircraft is a difficult and dangerous maneuver that is typically attempted only by military personnel throughout the world. There are two primary fuel delivery systems currently utilized in aerial refueling: hose and drogue systems and flying boom systems.

In a hose-and-drogue fuel delivery system, a drogue is attached to the outlet end of a hose. Within the drogue at the end of the hose is a reception coupling, such as a MA-2, MA-3 or MA-4 coupling that may provide the receiver aircraft surge protection and fuel delivery pressure regulation. The inlet end of the hose is attached to a hose reel onto which the hose is wound. The hose reel is typically mounted either within a tanker aircraft fuselage or on a refueling pod or module which is attached to the bottom of the tanker aircraft. A flying boom fuel delivery system utilizes a rigid, telescoping tube extending from a rear of the tanker aircraft with a probe and nozzle at a distal end. The probe and nozzle are inserted into a receptacle on a receiver aircraft to refuel the receiver aircraft. The boom also includes airfoils controlled by a boom operator stationed on the refueling aircraft. The airfoils allow the boom operator to actively maneuver the boom with respect to the receiver aircraft, which flies in a fixed refueling position below and aft of the tanker aircraft.

After the receiver aircraft is engaged with the reception coupling of a hose and drogue fuel delivery system or a nozzle of a flying boom fuel delivery system, fuel (e.g., aviation fuel) can be pumped from the tanker aircraft to the receiver aircraft. The fuel may be pumped using a fuel pump that is hydraulically driven generally by the same hydraulic system within the tanker aircraft that is used to deploy and control the fuel delivery system (e.g., the same hydraulic system used to deploy and control a hose of the hose and drogue fuel delivery system or the boom of the flying boom fuel delivery system). The flow rate or offload rate at which the fuel is pumped into the receiver aircraft may be governed by design standards as may a fuel delivery pressure to the receiver aircraft. When a fuel pumping operation begins, a refueling system may seek to maintain a target flow rate or offload rate. Initially, a fuel tank of the receiver aircraft may be relatively empty resulting in minimal back pressure and corresponding fuel delivery pressure. As the tank begins to fill, the back pressure increases. When the back pressure results in the fuel delivery pressure exceeding a design standard, the reception coupling or nozzle may partially close to reduce the flow rate (offload rate). The refueling system in the tanker aircraft, however, may continue to seek the target flow rate. The result is wasted energy in the form of a pressure difference at the reception coupling or nozzle and possible creation of heat that can heat the fuel being delivered and result in a less than optimal refueling process.

DETAILED DESCRIPTION

A fuel pump system for an aerial refueling system is described. The fuel pump system comprises: a variable displacement motor operable to be driven by a hydraulic fluid pressure; a fuel pump operable to be driven by the variable displacement motor, and a drive system controller (DSC) connected to the variable displacement motor, wherein the DSC is operable to direct an operation of the fuel pump in modes comprising: a flow control mode operable to maintain an output fuel flow rate from the fuel pump to a predetermined maximum inlet pressure at a reception coupling for a receiver aircraft; a fuel pressure control mode operable to regulate the output fuel flow rate to not exceed the predetermined maximum inlet pressure; and a priority mode operable to reduce the output fuel flow rate in response to a decrease in the hydraulic pressure.

An aerial refueling system for refueling a receiver aircraft in flight from a tanker aircraft is also disclosed. The aerial refueling system comprises: a fuel delivery system, such as a probe and drogue fuel delivery system or a flying boom fuel delivery system, comprising a motor operable to be driven by a hydraulic fluid pressure; a fuel pump coupled to the fuel delivery system, the fuel pump comprising a variable displacement motor operable to be driven by the hydraulic fluid pressure; and a DSC comprising instructions operable to control the variable displacement motor in modes comprising: a flow control mode to maintain an output fuel flow rate from the fuel pump to a predetermined maximum inlet pressure at a reception coupling for a receiver aircraft; a fuel pressure control mode to regulate a displacement of the variable displacement motor to not exceed the predetermined maximum inlet pressure; and a priority mode to reduce the displacement of the variable displacement motor in response to a decrease in the hydraulic pressure.

A method of refueling a receiver aircraft from a tanker aircraft is further disclosed. The method comprises: delivering fuel at a fuel flow rate from a fuel pump of the tanker aircraft to the receiver aircraft at a predetermined flow rate to a predetermined maximum inlet pressure at a reception coupling between the tanker aircraft and the receiver aircraft; and reducing the fuel flow rate below the predetermined fuel flow rate to not exceed the predetermined maximum inlet pressure.

Figure 1:
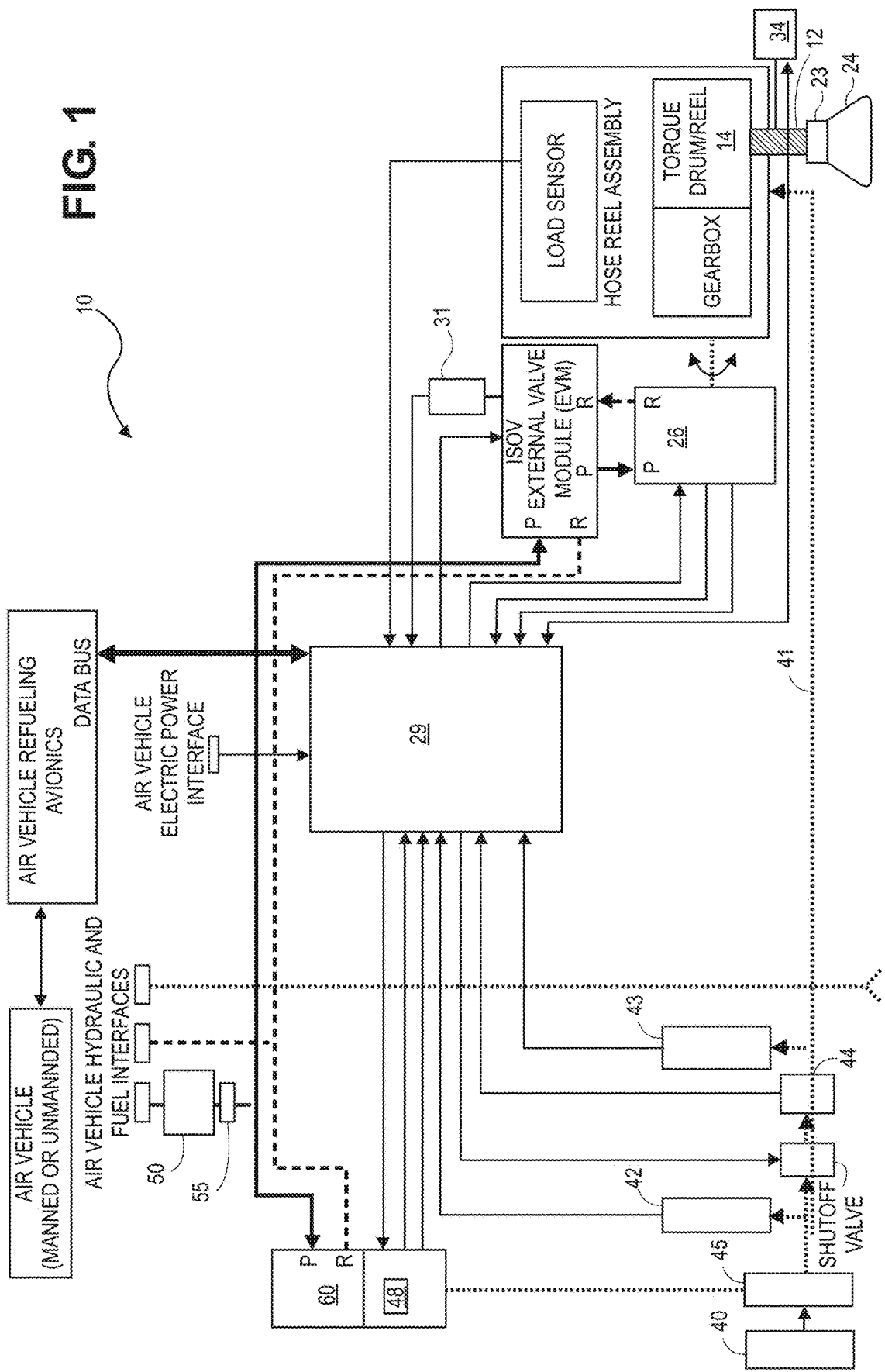
FIG. 1 shows a schematic diagram of an aerial refueling system.

FIG. 1 shows a schematic diagram of an aerial refueling system. Aerial refueling system 10 is provided in a tanker aircraft and is operable to fuel/re-fuel manned or unmanned air vehicles (a receiver aircraft) in flight. In this example, aerial refueling system 10 includes hydraulic system 15 that powers a hose reel drive portion (a fuel delivery system) and a refueling supply portion and drive system controller (DSC)

29 operable to control the operation of the hose reel drive portion and the refueling portion. Hydraulic system 15 includes hydraulic pump 55 that is connected through a supply conduit and a return conduit to each of the hose reel drive portion and the refueling supply portion of the aerial refueling system. Hydraulic pump 55 receives power from the engines of the tanker aircraft or an auxiliary power unit and pressurizes hydraulic fluid through the supply conduit which drives the reel drive portion and the refueling supply portion. A fluid reservoir and a filter system may also be associated with hydraulic system 15.

The refueling supply portion of aerial refueling system 10 includes fuel containment tank or tanks 40 that contain fuel for refueling a receiver aircraft. Fuel containment tank or tanks 40 supply fuel to fuel pump 45. Fuel pump 45 is a centrifugal pump including a variable displacement motor operable to be driven by a source of hydraulic fluid pressure. The source of hydraulic fluid pressure may be shared by the hose reel drive portion of the aerial refueling system (e.g., to power hydraulic motor 26). FIG. 1 shows reservoir 50 of hydraulic fluid and supply and return lines between reservoir 50 and hydraulic motor 26 (hose reel drive portion) and fuel pump 45 (refueling supply portion).

Figure 2:
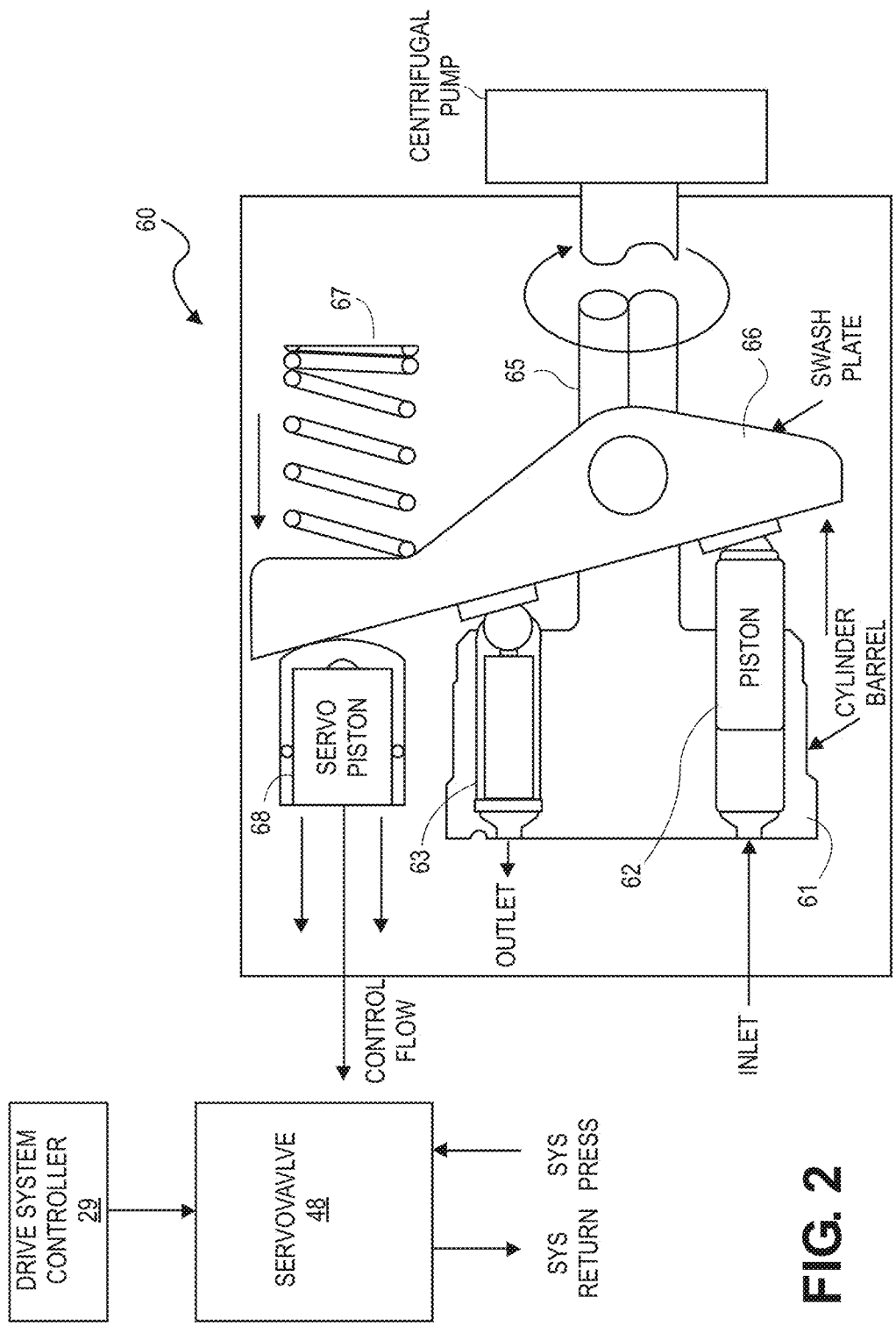
FIG. 2 shows a schematic cross-sectional view of a variable displacement motor that drives a centrifugal fuel pump for an aerial refueling system.

Fuel pump 45 is a centrifugal pump driven by a variable displacement motor. Fuel pump 45 receives fuel from fuel containment tank or tanks 40 and transfers the fuel to the receiver aircraft. An impeller of the centrifugal pump is connected to a drive shaft of variable displacement motor 60. Variable displacement motor 60 is powered by hydraulic system 15 (e.g., by hydraulic pressure from hydraulic system 15). FIG. 2 shows a cross-sectional side view of a portion of a variable displacement motor. Variable displacement motor 60 includes a number of pistons within cylinder block 61 (pistons 62 and 63 shown). Cylinder block 61 is connected to drive shaft 65 that is connected to the impeller of the centrifugal pump. The pistons (e.g., pistons 62 and 63) are arranged in an array (e.g., a circular array) within cylinder block 61 with each of the pistons including an end projecting from the cylinder block. The variable displacement motor also includes swashplate or yoke 66 positioned such that an end of each of the pistons bears on the swashplate. Swashplate 66 is offset by spring 67 and piston 68 (e.g., a servo piston) holding the motor at a desired displacement. An angle of swashplate 66 relative to drive shaft 65 (a cam angle) is set by electrohydraulic control valve 48 based on instructions from DSC 29.

Fuel pump 45 is connected to hose 12 at drum or reel 14 of the hose reel drive portion by conduit 41. In conduit 41 between fuel pump 45 and hose 12 may be pressure transducer 42 at the outlet of fuel pump 45 and pressure transducer 43 at the inlet of reception coupling 23 such as a MA-2, MA-3 or MA-4 coupling. Reception coupling 23 has an inlet side connected to a distal or outlet end of hose 12 and an opposite outlet side. Reception coupling 23 may or may not have a pressure regulator associated therewith to maintain an outlet pressure at a predetermined standard. Each of pressure transducer 42 and pressure transducer 43 may be electrically connected to DSC 29. Conduit 41 may also contain flow meter 44 that is connected to DSC 29. Also attached to the distal or outlet end of hose 12 is drogue 24.

Figure 3:
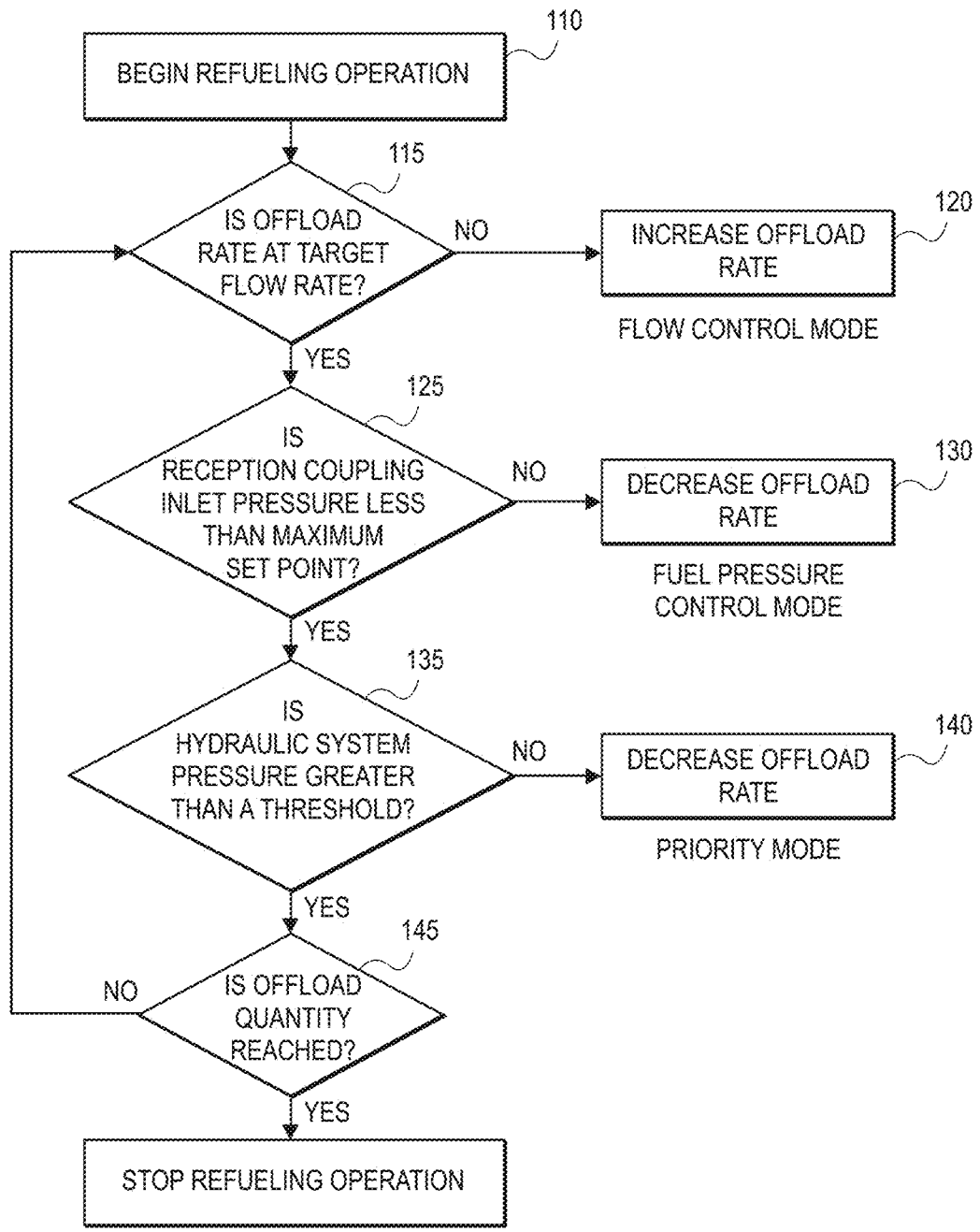
FIG. 3 is a flow chart of a method for refueling a receiver aircraft.

Successful engagement between a probe of a receiver aircraft and reception coupling 23 opens a passage for the flow of fuel from the tanker aircraft to the receiver aircraft. DSC 29 enters a "refueling" mode. DSC 29 contains non-transitory machine-readable instructions that include sending signals to electro-hydraulic control valve 48 to increase a displacement of variable displacement motor 60 and operate fuel pump to begin pumping fuel from fuel containment tank or tanks 40 to hose 12. FIG. 3 presents a representative flow diagram of a refueling method. As an example, a representative target flow rate of 220 gallons per minute (gpm) will be used as will a representative fuel delivery pressure of 50 pounds per square inch in gauge (psig). The fuel delivery pressure may also be regulated by reception coupling 23. A target flow rate set point (e.g., 220 gpm) and maximum coupling inlet pressure (e.g., 50 psig) may be programmed as set points in instructions in DSC 29. DSC 29 sends signals to electro-hydraulic control valve 48 to establish and maintain a fuel flow rate (offload rate) from centrifugal fuel pump 45 of the target flow rate of 220 gpm to a maximum inlet pressure at reception coupling 23 of 50 psig (block 110, FIG. 3). Initially, a fuel tank of the receiver aircraft may be relatively empty resulting in minimal back pressure and corresponding fuel delivery pressure. As the tank begins to fill, the back pressure and corresponding fuel delivery pressure may increase. A fuel delivery pressure may be continuously monitored by DSC 29 during a refueling operation based on signals from pressure transducer 42 at the outlet of fuel pump 45 and pressure transducer 43 at a junction of conduit 41 and reception coupling 23. DSC 29 includes instructions to calculate and calculates a fuel delivery pressure representatively as a pressure at the outlet of fuel pump 45 (based on signals from pressure transducer 42) minus a pressure drop in conduit 41 (based on signals from pressure transducer 43). At this stage of the refueling process, DSC 29 and fuel pump 45 are in a fuel flow control mode with DSC 29 monitoring signals from pressure transducer 42 and pressure transducer 43 and maintaining a target flow rate (e.g., 220 gpm) while a maximum inlet pressure at reception coupling 23 is 50 psig or less (block 115, FIG. 3). If a fuel flow rate (offload rate) is less than the target flow rate (e.g., 220 gpm) and the fuel delivery pressure is less than 50 psig, DSC 29 will send a signal to electro-hydraulic control valve 48 to change a cam angle of the swashplate to increase the displacement of variable displacement motor 60 (block 120, FIG. 3).

When the inlet pressure at reception coupling 23 approaches or exceeds a target set point (e.g., 50 psig), DSC 29 enters a fuel pressure control mode whereby in response from a signal or signals from DSC 29 to electro-hydraulic control valve 48, a displacement of variable displacement motor 60 of fuel pump 45 is reduced to reduce a fuel flow rate (offload rate) below the target flow rate to prevent the inlet pressure at reception coupling 23 from exceeding 50 psig (block 125 & 130, FIG. 3). The continuous monitoring by DSC 29 of the fuel delivery pressure may result in continuous reductions in displacement and thus torque of variable displacement motor 60 and the revolutions per minute of the centrifugal pump of fuel pump 45 and the fluid flow rate (offload rate) in the process of refueling the receiver aircraft. The flow of fuel from containment tank or tanks 40 through conduit 41 into the receiver aircraft continues until an offload quantity is reached (block 145, FIG. 3).

As noted above, aerial refueling system 10 may include a common source of hydraulic pressure for the hose reel drive portion (of a probe and drogue fuel system) and the refueling supply portion. The hydraulic pressure is supplied by hydraulic pump 55 to each of motor 26 of the hose reel drive portion and motor 60 driving fuel pump 45 of the refueling supply portion of the aerial refueling system. From time to time in an aerial refueling operation where the hose reel drive portion and the refueling supply portion share a common source of hydraulic pressure, there may be instances where a hydraulic pressure demand from motor 26 of hose reel drive portion and motor 60 driving fuel pump 45 of refueling supply portion could exceed supply. For instance, motor 26 of hose reel drive portion may require a minimum hydraulic pressure to maintain hose 12 at a particular hose speed (e.g., zero) during refueling of a receiver aircraft. At the same time, fuel pump 45 of refueling supply portion may require a certain hydraulic pressure to achieve a target fuel flow rate (offload rate) or fuel flow rate calculated based on a fuel delivery pressure.

DSC 29 includes instructions that monitor a hydraulic pressure provided to aerial refueling system 10 by hydraulic pump 55. The instructions also include instructions that set a displacement of variable displacement motor 60 so that at least a minimum hydraulic pressure is available to motor 26 of the hose reel drive portion (a priority mode). In one example, instructions associated with DSC 29 may include instructions to set a displacement of variable displacement motor 60 at zero displacement so that a minimum of a hydraulic pressure of 1700 psi to motor 26 of the hose reel drive portion is maintained. Instructions associated with DSC 29 may further include instructions that reduce a displacement of variable displacement motor 60 when a hydraulic pressure available to motor 26 reaches a minimum threshold hydraulic pressure, such as 2200 psi. If the hydraulic pressure available to motor 26 drops below the threshold hydraulic pressure (e.g., below 2200 psi), DSC 29 will reduce the displacement of variable displacement motor 60 of fuel pump 45 resulting in a decrease in a fuel flow rate (offload rate) by fuel pump 45 (block 140, FIG. 3). The continuous monitoring by DSC 29 of the hydraulic pressure as the hydraulic pressure drops below the threshold hydraulic pressure (e.g., 2200 psi) may result in continuous reductions in displacement of variable displacement motor 60 to maintain at least the minimum hydraulic pressure (e.g., 1700 psi) available to motor 26. In addition, in response to a loss of power or command at the electrohydraulic control valve 60, the cam angle defaults to zero displacement of variable displacement motor 60.

During a refueling process, there may be fuel pressure surges, for example, due to a valve closure at the receiver end. Such pressure surge may occur while DSC 29 and fuel pump 45 are in any control mode (e.g., fuel control mode, fuel pressure control mode or priority mode). These pressure surges may be detected by pressure transducer 42 and/or pressure transducer 43 in conduit 41. In response to a pressure surge detected by pressure transducer 42 and/or pressure transducer 43, DSC 29 may include instructions that override a particular control mode and direct electrohydraulic control valve 48 to reduce a displacement of variable displacement motor 60 of fuel pump 45 by changing cam angle γ and thus reduce a fuel flow rate (offload rate).

In the above description, a fuel pump driven by a variable displacement motor is described in connection with a probe and drogue-type aerial refueling system. A fuel pump driven by a variable displacement motor can also be used in other systems, such as flying boom-type system. The operation of the boom may be hydraulically powered and share a source of hydraulic pressure with the refueling supply portion. For example, the hydraulic pressure is supplied by hydraulic pump 55 to each of a motor for the boom and fuel pump 45 of refueling supply portion. Where a demand for hydraulic pressure exceeds supply, a priority mode operation of DSC 29 and fuel pump 45 will favor the boom and, as necessary, reduce a displacement of the variable displacement motor (motor 60) associated with the fuel pump so that the boom operation functions as desired. In such a flying boom-type system, the DSC and fuel pump may also include a flow control mode and a fuel pressure control mode as described above.

Aspect

The invention may be characterized by the following aspects.

1. A fuel pump system for an aerial refueling system comprising:
    a variable displacement motor operable to driven by hydraulic fluid pressure;
    a fuel pump operable to be driven by the variable displacement motor, and
    a drive system controller connected to the variable displacement motor, wherein the drive system controller is operable to direct an operation of the fuel pump in modes comprising:
        a flow control mode operable to maintain an output fuel flow rate from the fuel pump to a predetermined maximum inlet pressure at a reception coupling for engagement by a receiver aircraft;
        a fuel pressure control mode operable to regulate the output fuel flow rate to not exceed the predetermined maximum inlet pressure; and
        a priority mode operable to reduce the output fuel flow rate in response to a decrease in the hydraulic pressure.

2. The fuel pump system of Aspect 1, wherein the variable displacement motor further comprises:
    an electrohydraulic control valve coupled to the drive system controller and operable to set a displacement of motor based on instructions from the drive system controller.

3. The fuel pump of Aspect 2, wherein the displacement of the motor defaults to zero displacement in response to a loss of power or command at the electrohydraulic control valve.

4. The fuel pump system of any of Aspects 1-3, wherein the decrease in the source of hydraulic pressure in the priority mode is a result of a demand of hydraulic pressure by a fuel delivery system of the aerial refueling system.

5. The fuel pump system of any of Aspects 1-4, wherein, in the priority mode, the drive system controller is operable to reduce the output fuel flow rate when a decrease of the hydraulic pressure reaches a threshold hydraulic pressure above a minimum hydraulic pressure.

6. The fuel pump of any of Aspects 1-5, wherein the drive system controller is operable to reduce a displacement of the variable displacement motor in response to a pressure surge detected in the delivery of fuel to a receiver aircraft.

7. An aerial refueling system for refueling a receiver aircraft in flight from a tanker aircraft, the aerial refueling system comprising:
    a fuel delivery system comprising a motor operable to be driven by a hydraulic fluid pressure;
    a fuel pump coupled to the fuel delivery system, the fuel pump comprising a variable displacement motor operable to be driven by the hydraulic fluid pressure; and
    a drive system controller comprising instructions operable to control the variable displacement motor in modes comprising:
        a flow control mode to maintain an output fuel flow rate from the fuel pump to a predetermined maximum inlet pressure at a reception coupling for a receiver aircraft;

a fuel pressure control mode to regulate a displacement of the variable displacement motor to not exceed the predetermined maximum inlet pressure; and a priority mode to reduce the displacement of the variable displacement motor in response to a decrease in the hydraulic pressure.

8. The aerial refueling system of Aspect 7, wherein the fuel delivery system comprises a probe and drogue system.

9. The aerial refueling system of Aspect 7, wherein the fuel delivery system comprises a flying boom system.

10. The aerial refueling system of any of Aspects 7-9, wherein the fuel pump further comprises an electro-hydraulic control valve coupled to the drive system controller, wherein the elector-hydraulic control valve determines a displacement of the variable displacement motor.

11. The aerial refueling system of any of Aspects 7-10, wherein the decrease in the source of hydraulic pressure in the priority mode is a result of a demand of the hydraulic pressure by the fuel delivery system.

12. The aerial refueling system of Aspect 11, wherein instructions of the drive system controller are operable to reduce the displacement of the variable displacement motor when a decrease of the hydraulic pressure reaches a threshold hydraulic pressure above a minimum hydraulic pressure required for the fuel delivery system.

13. The aerial refueling system of Aspect 12, wherein the instructions are operable to reduce the displacement of the variable displacement motor to zero should the hydraulic pressure reach the minimum hydraulic pressure required for the fuel delivery system.

14. The aerial refueling system of any of Aspects 7-13, wherein the drive system controller further comprises instructions operable to reduce a displacement of the variable displacement motor in response to a pressure surge detected in the delivery of fuel to a receiver aircraft.

15. A method of refueling a receiver aircraft from a tanker aircraft comprising:

delivering fuel at a fuel flow rate from a fuel pump of the tanker aircraft to the receiver aircraft at a predetermined flow rate to a predetermined maximum inlet pressure at a reception coupling between the tanker aircraft and the receiver aircraft; and reducing the fuel flow rate below the predetermined fuel flow rate to not exceed the predetermined maximum inlet pressure.

16. The method of Aspect 15, wherein the fuel pump comprises a variable displacement motor and the fuel flow rate is produced by a displacement of the variable displacement motor.

17. The method of Aspect 16, wherein the variable displacement motor is operable to be driven by a hydraulic fluid pressure, the method further comprising:

reducing a displacement of the variable displacement motor in response to a decrease in the hydraulic fluid pressure.

18. The method of Aspect 17, wherein reducing a displacement of the variable displacement motor comprises reducing when a decrease of the hydraulic pressure reaches a threshold hydraulic pressure above a minimum hydraulic pressure.

19. The method of Aspect 18, wherein reducing the displacement of the variable displacement motor comprises reducing the displacement to zero when the hydraulic pressure the minimum hydraulic pressure.

20. The method of any of Aspects 15-19, wherein the tanker aircraft further comprises a fuel delivery system comprising a motor operable to be driven by the hydraulic fluid pressure and the decrease in the hydraulic fluid pressure comprises operation of the motor of the fuel delivery system.

21. The method of Aspect 20, wherein the fuel delivery system comprises a probe and drogue system.

22. The method of Aspect 20, wherein the fuel delivery system comprises a flying boom system.

23. The method of any of Aspects 15-22, further comprising reducing the fuel flow rate in response to a pressure surge detected in the delivery of fuel to the receiver aircraft.

24. The method of any of Aspects 15-23, wherein reducing the fuel flow rate below the predetermined fuel flow rate to not exceed the predetermined maximum inlet pressure comprises reducing a displacement of the variable displacement motor.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of refueling a receiver aircraft from a tanker aircraft comprising:

delivering fuel from a fuel pump of the tanker aircraft to the receiver aircraft at a predetermined fuel flow rate to a predetermined maximum inlet pressure at a reception coupling between the tanker aircraft and the receiver aircraft, wherein the fuel pump comprises a variable displacement motor operable to be driven by a hydraulic fluid pressure and the fuel flow rate is produced by a displacement of the variable displacement motor;

reducing the fuel flow rate below the predetermined fuel flow rate to not exceed the predetermined maximum inlet pressure; and reducing a displacement of the variable displacement motor in response to a decrease in the hydraulic fluid pressure, wherein reducing a displacement of the variable displacement motor comprises reducing when a decrease of a hydraulic pressure reaches a threshold hydraulic pressure above a minimum hydraulic pressure.

2. The method of claim 1, wherein the tanker aircraft further comprises a fuel delivery system comprising a motor operable to be driven by the hydraulic fluid pressure and the decrease in the hydraulic fluid pressure comprises operation of the motor of the fuel delivery system.

3. The method of claim 2, wherein the fuel delivery system comprises a probe and drogue system.

4. The method of claim 2, wherein the fuel delivery system comprises a flying boom system.

5. The method of claim 1, wherein reducing the displacement of the variable displacement motor comprises reducing the displacement to zero when the hydraulic pressure reaches the minimum hydraulic pressure.

6. The method of claim 1, further comprising reducing the fuel flow rate in response to a pressure surge detected in the delivery of fuel to the receiver aircraft.

7. The method of claim 1, wherein reducing the fuel flow rate below the predetermined fuel flow rate to not exceed the predetermined maximum inlet pressure comprises reducing a displacement of the variable displacement motor.

* * * * *